United States Patent [19]

Tarsia

[11] 4,432,638

[45] Feb. 21, 1984

[54] ALIGNMENT STRUCTURE

[75] Inventor: Giuseppe Tarsia, Valley Stream, N.Y.

[73] Assignee: Berkey Photo, Inc., White Plains, N.Y.

[21] Appl. No.: 349,771

[22] Filed: Feb. 18, 1982

[51] Int. Cl.³ ............................................. G03B 27/52
[52] U.S. Cl. ........................................ 355/63; 355/21
[58] Field of Search ............... 248/125, 178, 183, 287; 308/3 R, 3.9; 355/18, 21, 39, 55, 56, 63, 58

[56] References Cited

U.S. PATENT DOCUMENTS

| | | | |
|---|---|---|---|
| 2,324,842 | 7/1943 | Huebner | 355/60 |
| 2,353,512 | 7/1944 | Simmon | 355/67 |
| 2,789,459 | 4/1957 | May | 355/63 |
| 2,813,454 | 11/1957 | Simmon | 355/58 |
| 3,270,652 | 9/1966 | Mason et al. | 355/63 |
| 3,531,197 | 9/1970 | King | 355/18 |
| 3,790,274 | 2/1974 | Smoot et al. | 355/55 |
| 3,862,734 | 1/1975 | Buchin et al. | 248/125 |
| 3,871,765 | 3/1975 | Pramstraller | 355/18 |
| 4,066,356 | 1/1978 | Parker | 355/63 |
| 4,097,144 | 6/1978 | Prochnow | 248/125 X |

FOREIGN PATENT DOCUMENTS 1434537 5/1976 United Kingdom.

Primary Examiner—Richard A. Wintercorn
Attorney, Agent, or Firm—Neuman, Williams, Anderson & Olson

[57] ABSTRACT

In a photographic enlarger apparatus having a carriage operatively connected to a vertical column for movement thereon to a selected position, an alignment structure is provided for maintaining the carriage in three-dimensional alignment with the column. In one embodiment, a roller captively eccentrically journaled in the front of the carriage is biased against one face of the column to maintain the carriage in axial alignment with respect thereto. Further alignment of the carriage with respect to the column is provided by four wheels mounted in the back of the carriage to rotatably engage opposed channels formed in the rear of the column, two vertically aligned wheels being spring-biased against one channel and coacting with two vertically aligned fixed wheels riding in an opposite channel to urge the carriage into constant lateral alignment.

32 Claims, 8 Drawing Figures

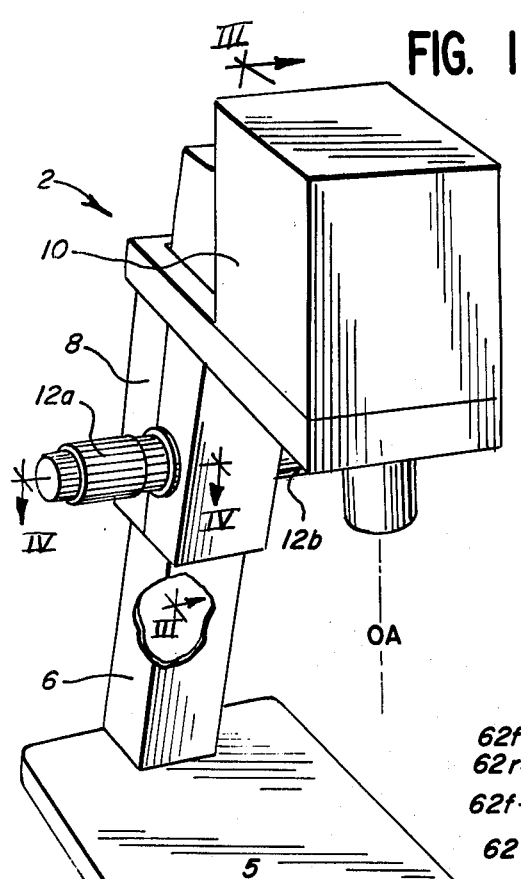
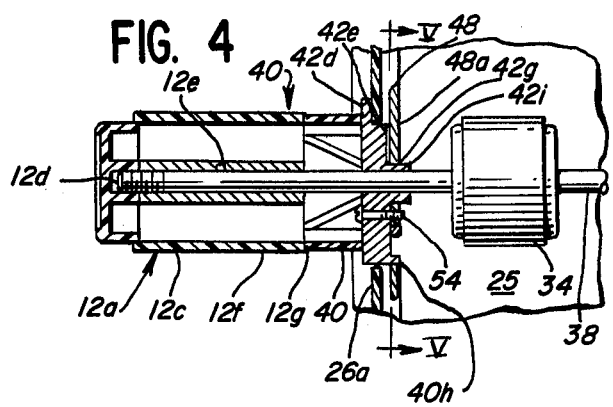
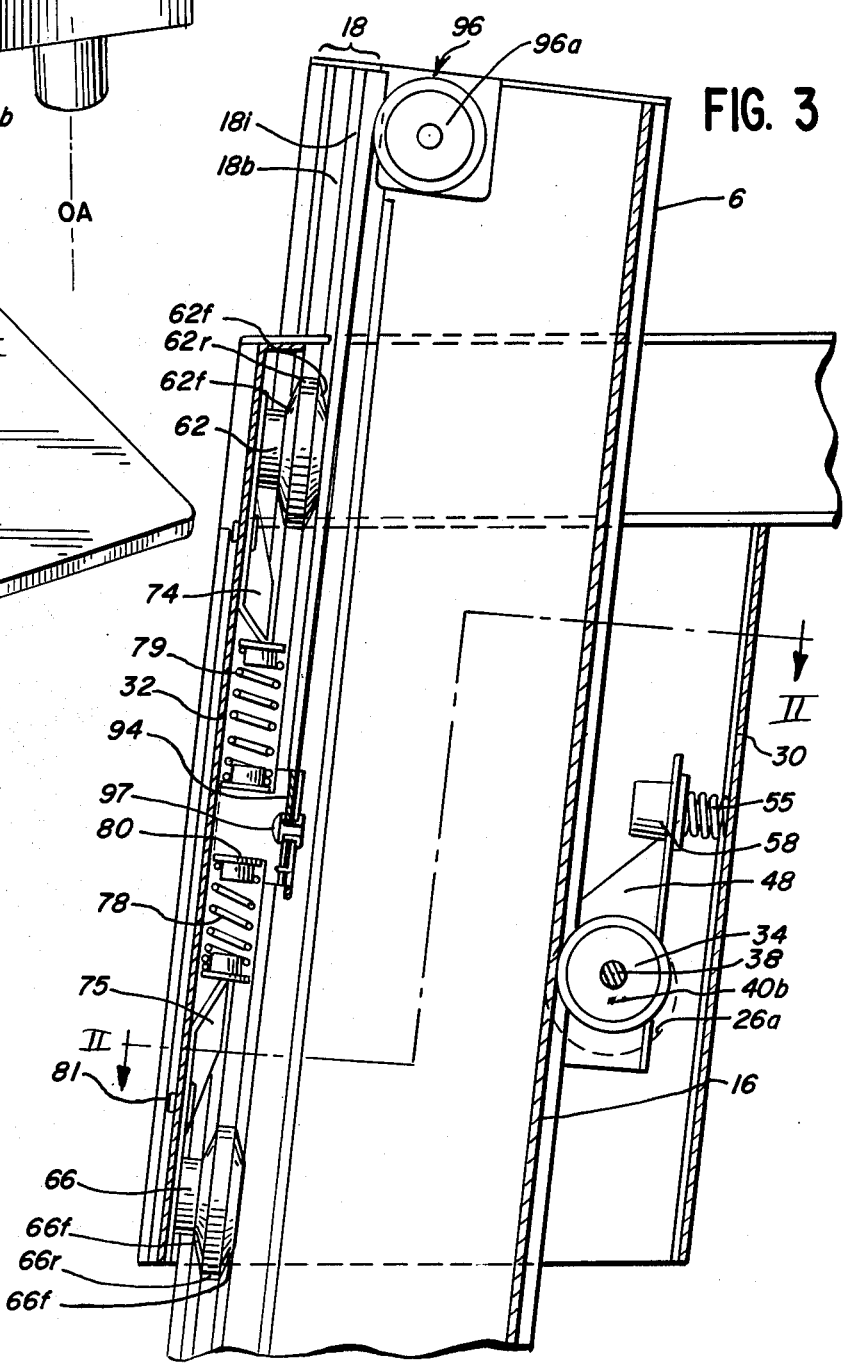

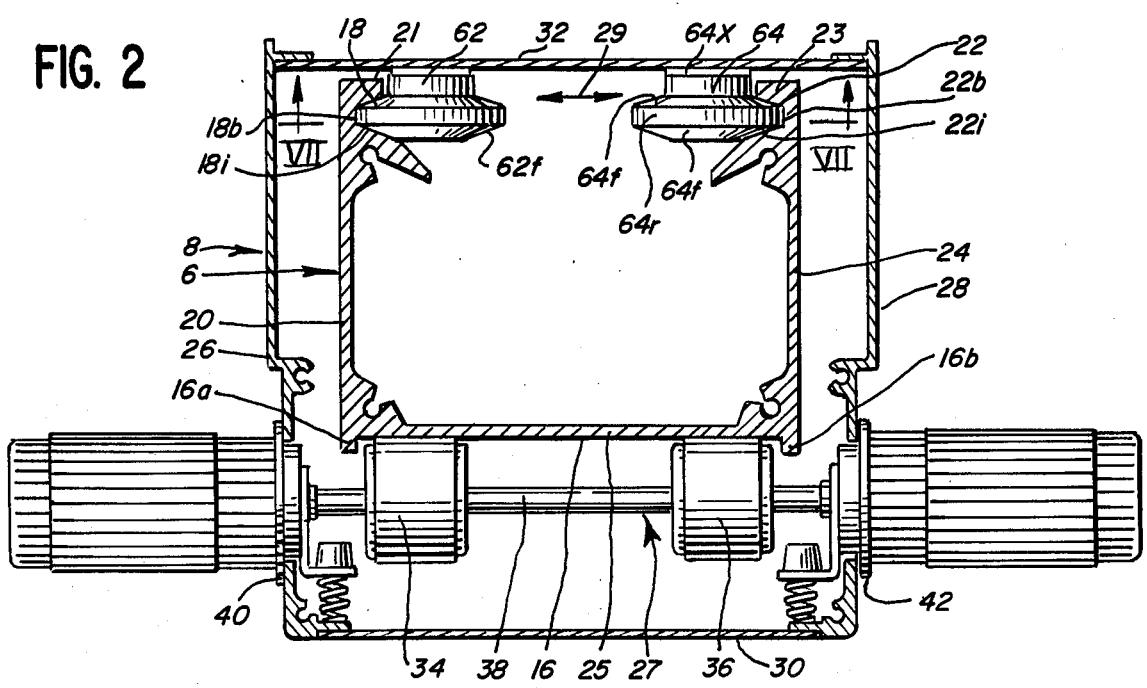
FIG. 2
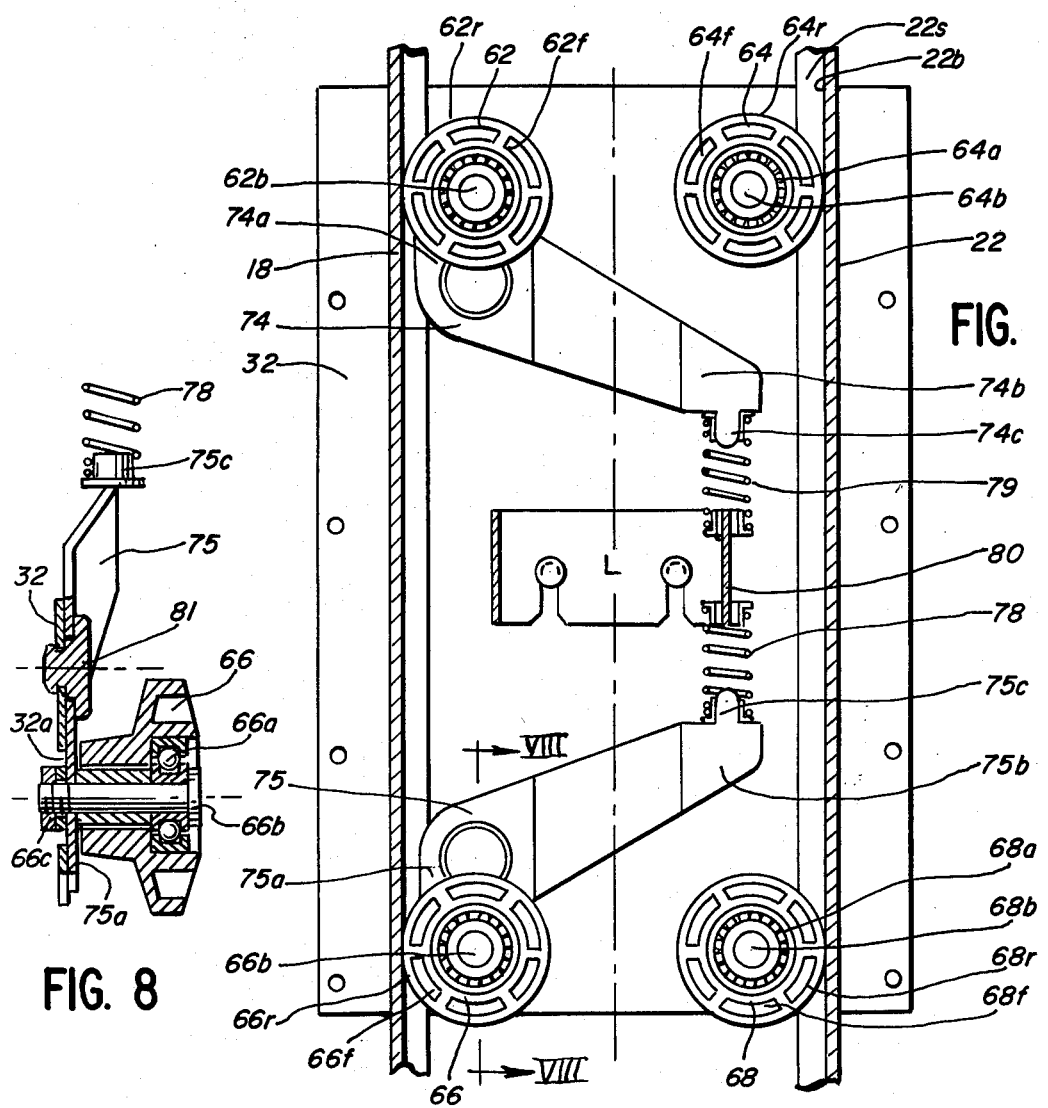
FIG. 7
FIG. 8

ALIGNMENT STRUCTURE

BACKGROUND OF THE INVENTION

This invention relates to alignment structures for photographic apparatus. More particularly it relates to a self-aligning carriage as might be used to align, position, and support a photographic enlarger or other projection device which is operatively connected to a vertical column, for smooth and accurate movement therealong.

In some photographic applications it is common to provide a vertical support structure which permits adjustable positioning therealong of a photographic apparatus, such as a camera, enlarger, or projector. For example, an overhead enlarger may be vertically positioned over a photosensitive material, such as print paper, for exposure to light from the enlarger that has been projected through an image bearing medium, such as a negative, transparency, pattern or grid. For both image clarity and high resolution it is necessary to maintain the enlarger and its optical system in true alignment with the photosensitive paper. Thus, it is necessary that the apparatus be in constant, accurate three-dimensional alignment with respect to the vertical column, which in turn results in proper alignment with the photosensitive paper. On the other hand, the enlarger must be easily vertically adjustable to accommodate various sized transparencies and to provide multiple print sizes.

In the known photographic apparatus support structures, wheeled carriages have been arranged for vertical motion along structurally defined paths with little or no means for correcting play, misalignment, or slack resulting from wear and tear to rollers, bearings and tracks over time. Where employed, prior art alignment structures have either been complex or required continuing observation and manual adjustment. Indeed, some of the known support systems merely provided for angular alignment around a vertical support, making no provision for coaxial alignment.

SUMMARY OF THE PRESENT INVENTION

It is an object of the present invention to overcome the deficiencies experienced with prior photographic apparatus alignment structures. More specifically, it is an object to provide an alignment structure effective in all three dimensions which is simple in construction and operation, while being superior to prior art devices with respect to performance and reliability.

It is another object of the present invention to provide a photographic apparatus alignment structure which is self-adjusting and can be employed without the need for manual observation or adjustment.

It is still another object of this invention to provide an alignment structure which can be adapted for use with differently configured columns and carriage mechanisms.

It is yet another object of this invention to provide an alignment structure which is maintenance-free and not adversely affected in its operation by normal wear of rollers, bearings and other components.

These and other objects of the invention will be apparent hereinafter from the specification which describes the best mode of practicing the invention as currently known, its use and operation, and a preferred embodiment. Reference should also be made to the drawings, which constitute a part of the disclosure, and the subject matter claimed.

Generally, the objects of the present invention are accomplished in an alignment structure having a carriage operatively connected to a generally vertical column for movement thereon. The column has a first track means extending along one side and a second track means along an opposite side of the column. The track means can be ridges, grooves or channels formed within the column, or even a face thereof. First roller means in the form of rollers or wheels are captively journaled in the front of the carriage and biased for contact with the first track means. It will be appreciated that one or a plurality of rollers may be used; and, further, that any number of conventional bias means may be employed to urge the first roller means into contact with the first track means. Second roller means in the form of rollers or wheels are situated on the side of the column opposite the first roller means and comprises three rollers each mounted on an axis orthogonal to the axis of the column and the axis of the first rollers. Two vertically-aligned and spaced apart rollers are fixedly mounted for rotation in the second track means. A biased roller is laterally spaced and laterally moveable with respect to the fixed rollers, and it also rides in the second track means. The spring-biased wheel coacts with the fixedly mounted wheels to urge them into constant lateral alignment with respect to the column. It will be appreciated that, here too, additional rollers may be provided and that various bias means may be employed to urge the biased rollers into rotatable engagement with the second track means.

Also, a spring fixedly attached to the carriage and mounted near the top of the column exerts a lifting force on the carriage to counterbalance its weight.

From the description thus far provided, it is apparent that the proposed alignment structure may be used for a number of vertical or horizontal photographic apparatus support structures such as are well known in the art.

BRIEF DESCRIPTION OF THE DRAWINGS

For a more complete understanding of this invention, reference should be made to the drawings, as briefly described below:

FIG. 1 is a perspective view of a photographic apparatus support structure with an embodiment of the alignment structure of the present invention shown thereon.

FIG. 2 is a section view of the carriage and column encased therein, taken substantially along line II—II of FIG. 3 and illustrating front rollers biased against the forward column face and wheels riding in tracks along the rear of the column.

FIG. 3 is an enlarged section view of the carriage of FIG. 1, taken substantially along line III—III of FIG. 1 and illustrating front and rear roller and biasing means in operative engagement with the column.

FIG. 4 is an enlarged partial section view of FIG. 1, taken substantially along line IV—IV of FIG. 1 and illustrating a front roller and a portion of its biasing means.

FIG. 7 is a plan view taken substantially along line VII—VII of FIG. 2 showing an embodiment of a carriage back plate assembly suitable for use in the present invention.

FIG. 8 is an enlarged side view of a wheel rotatably mounted at the end of a lever in a back plate assembly, taken substantially along line VIII—VIII of FIG. 7.

DESCRIPTION OF THE PREFERRED EMBODIMENT

Figure 5:
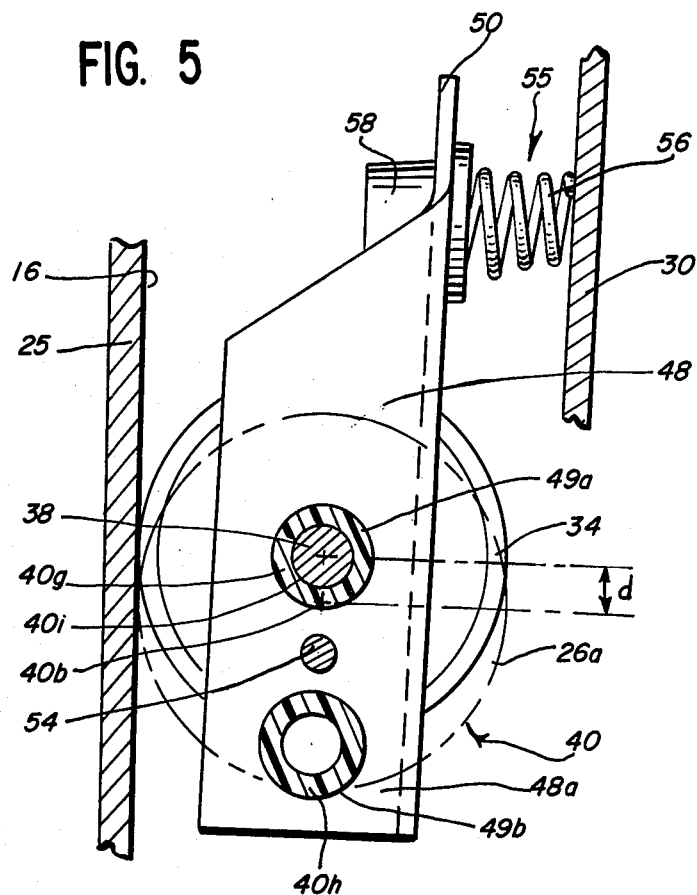
FIG. 5 is an enlarged section view of a portion of the front biasing means of FIG. 4, taken substantially along line V—V of FIG. 4 and illustrating a spring-biased eccentric bushing urging the front roller against the front face of the column.

Referring now to FIG. 1, a typical photographic apparatus 2 is illustrated including a support and alignment structure cooperating with a vertical column. Although the invention will be described in terms of a photographic enlarger, it is to be understood that it is also compatible with cameras, projectors, or still other equipment. The apparatus includes a base 4 having a generally flat surface 5 which typically is used to support or hold, with conventional means, a sheet of photosensitive paper upon which an image may be projected. A generally vertical column 6 is rigidly attached thereto and extends generally perpendicularly upward therefrom. A carriage 8 is operatively connected to the column 6 for selected vertical movement therealong and alignment therewith. It carries a photographic enlarger 10 having an optical axis or center of projection OA. In order to achieve optimum optical characteristics, it is important that the carriage be mounted to column 6 in such a way that the proper orthoginal alignment of the optical axis OA, extending from the photographic apparatus 10 to the base 4, is constantly maintained. A pair of knurled knobs 12a and 12b assist in vertically positioning the carriage 8 along column 6 as will hereinafter be explained in more detail.

Referring now to FIG. 2, and using like numbers to designate like items to assist in understanding the several views, a column 6 is shown having a generally U-shaped cross section along its entire length, said cross section being taken perpendicular to the longitudinal axis thereof. The opposing column side walls 20 and 24 are planar and parallel to one another. The front wall 25 is planar and perpendicular to the side walls 20, 24 and the portion opposite the front wall is open. The front outer face 16 of front wall 25 is generally flat with small ridges 16a, 16b vertically disposed at the edge thereof. Immediately inside each rear edge 21 and 23 of each side wall 20, 24 there is formed therein a channel which is vertically coextensive with the column 6 and is of a predetermined cross section as taken perpendicular to the length thereof. Thus, channel 18 is formed in the rear edge of column side 20, and channel 22 is formed in the rear edge of column side 24, with the open sides of the channels opposing each other across the rear of the column. Column 6 may be constructed of a single piece of extruded metal or any suitable substitute.

The carriage 8 has a generally rectangular cross section that corresponds to and surrounds the column 6 to which it is operatively attached. Carriage 8 includes opposing side walls 26 and 28, a front wall 30, and a back plate 32, all fixedly assembled to form a rigid load bearing structure. As with the column 6, the opposing side walls 26 and 28 are generally planar and parallel to one another, and the front wall 30 is generally planar and perpendicular to the side walls. The back plate 32 is substantially parallel to the front wall 30 and closes the back of the carriage 8. Carriage 8 may be constructed of welded metal components or it may be extruded as a single metal piece.

Carriage 8 is maintained in three-dimensional alignment with respect to column 6 by complementary action of a first and second roller means 27 and 29. The first roller means 27 comprises a pair of wide-faced rollers 34 and 36 rotationally mounted on an axle 38 which passes through the axis of rotation of each roller. Axle 38 is suitably attached to side walls 26 and 28 by journal means 40 and 42. Rollers 34 and 36 are mounted in fixed spaced relation on axle 38, which in turn is mounted forward of the column front face 16 so that the radial face of each roller 34, 36 may contact the front face 16.

Figure 6:
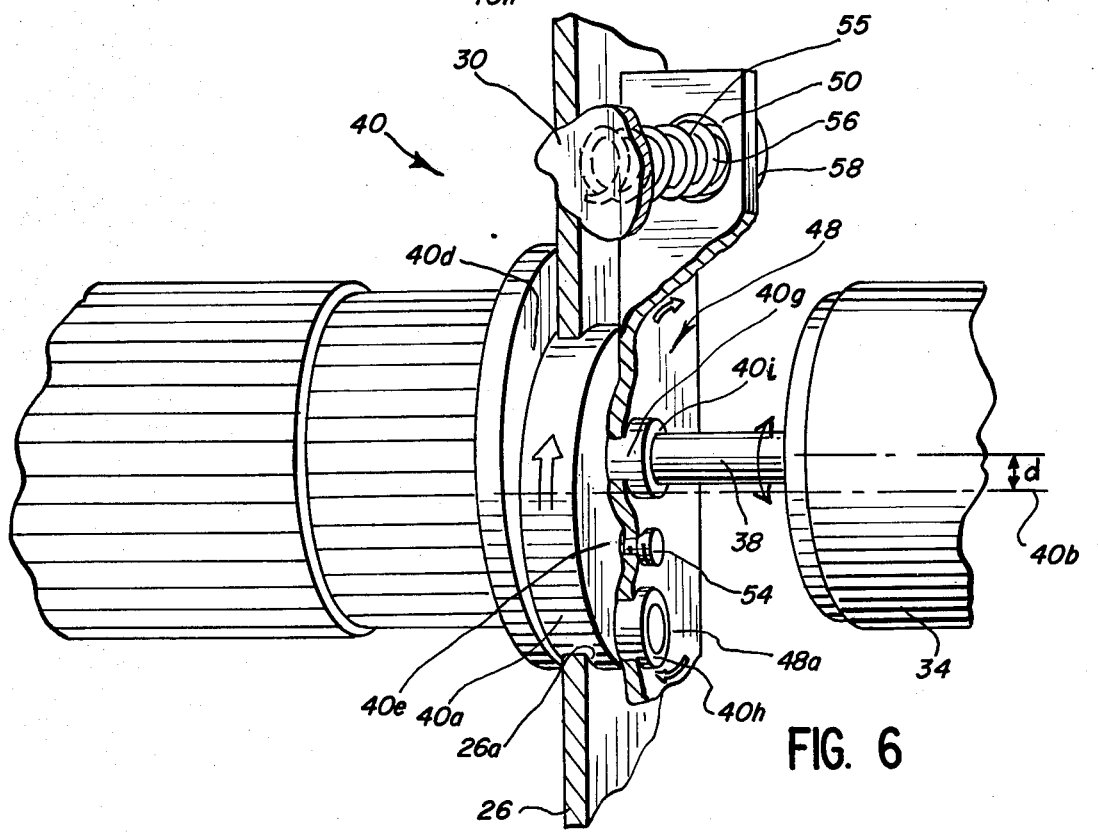
FIG. 6 is a perspective view of the eccentric bushing shown in FIGS. 4 and 5.

Referring also to FIGS. 4, 5 and 6, the journal means 40 will be described in detail, it being understood that the opposite journal means 42 is a mirror image thereof. A cylindrical bearing surface 40a is received in port 26a of the sidewall 26, the two adapted for ease of rotation, while maintaining relatively accurate concentric axial alignment along the bushing axis of rotation 40b. An annular flange 40d is in flush face-to-face relation with the outside of the carriage side plate 26 to assist in positioning the bushing 40. The bushing has a relatively flat face 40e just inside the carriage side wall 26, and a pair of bosses 40g and 40h protruding therefrom. At least one of these bosses, 40g, is displaced a throw distance d from the bushing axis of rotation 40b and has a bore 40i extending therethrough to rotatably receive the roller axle 38. The other boss may be placed as convenient or desireable. As a result, rotation of the bushing with respect to the side wall 26 effects eccentric or cam-like movement of the roller axle 38 toward and away from the front outer face 16 of the column front wall 25.

A suitable bias means for this application is shown in FIGS. 4, 5 and 6. A unitary plate-like lever arm 48 has a bushing portion 48a parallel to carriage side portion 26 along its length, and a biased portion which is perpendicular thereto at its uppermost portion 50. The bushing portion defines a pair of boss receiving apertures 49a and 49b to accommodate the respective bosses 40g and 40h when the bushing portion is attached in face-to-face relation with the bushing face 40e. Lever arm 48 is fixedly attached to bushing 40 by screw 54. Bias means 55 in the form of a tension spring 56 connects the uppermost portion 50 of lever arm 48 with carriage front wall 30, which acts as a fixed ground for one end of the spring. Cup 58 is affixed to lever arm 48 for receiving the other end of the spring 56.

In operation, lever arm 48 is biased by spring 56 to rotate in the direction of the arrows shown, thereby imparting to bushing 40 a moment about center of rotation 40b. Axle 38, engaged with bushing 40 at boss 40g is moved toward the column front face 16 with a predetermined force based upon the compression of spring 56, the length of lever arm 48, and the throw distance d between the center of rotation of axle 38 and the center of rotation 40b of eccentric bushing 40.

Referring to FIG. 4, a handle 12a is attached to the front roller axle 38 to assist the operator in vertically positioning the carriage 8 along the vertical column 6. The handle is generally cylindrical with a knurled outer surface 12c for a slip-free grip. An end of the axle 38 extending through the bushing 40 is disposed within and affixed to a coaxial passage 12d in the handle. A pin 12e may assist in retaining the axle in fixed rotational relation therewith. The carriage end 12f of the handle has a bearing surface 12g perpendicular to the handle axis for rotational sliding abutment against the bushing 40 so that the handle 12a and axle 38 may rotate independently thereof.

Referring now to FIGS. 2, 7 and 8, the back plate 32 of the carriage 8 carries the second roller means 29, which provide lateral alignment. Four wheels 62, 64, 66 and 68, are utilized, each having a cross sectional configuration, taken parallel to the wheel axis, which conforms substantially to the cross sectional configuration of its corresponding mating channel cross section, taken perpendicular to the longitudinal axis thereof. For instance, the radial edge surface 64r bears against the bottom 22b of the respective channel 22, and the lateral facing surfaces 64f on the front and back of wheel 64 each bear against the side walls of the respective channel 22. FIG. 7 shows a carriage back plate assembly in accordance with the present invention, the back plate assembly having a longitudinal axis L.

A first pair of vertically aligned and spaced part wheels 64 and 68 is fixedly positioned and rotatably mounted on an axis transverse to the longitudinal axis of the column 6 and the longitudinal axis of the first roller means 34 and 36, i.e. axle 38. Said first wheels are rotationally mounted on bearings 64a, 68a, which are retained in position by axle pins 64b, 68b, each fixed in perpendicular alignment with back plate 32. Due to the spaced vertical alignment of the wheels 64 and 68, they maintain the longitudinal axis of the back plate 32 generally parallel to the longitudinal axis of the column 6 when each is seated in its cooperating channel 22.

A second pair of like configured wheels 62 and 66 is laterally spaced from said first pair of wheels, i.e. transverse to the longitudinal axis, and mounted for rolling movement in the opposing channel 18. Although wheels 62 and 66 are rotationally mounted in the same manner as wheels 64, 68, they are laterally moveable with respect to said opposing wheels. Their axle pins 62b, 66b are attached to one end 74a, 75a of a lever arm 74, 75 that is pivotally mounted in substantially coplanar relation to the back plate 32, and spring-biased at the other end 74b, 75b. The spring-biased ends 74b, 75b include extending tabs 74c, 75c, to capture the urging end of a coiled spring 78, 79 or like bias means. If one desires to use four identical wheels, it may be necessary to insert a shim, as illustrated at 64x, over the axle pins 64b, 68b between the wheel and back plate 32 to compensate for the thickness of arm 75 and to maintain proper alignment.

Referring to FIG. 8, wheel 66 and its associated bearing 66a are attached to end 75a of the lever arm 75 by a threaded axle bolt 66b, secured with a nut or other fastening means 66c. Lever arm 75 is pivotally attached to the back plate 32 by a rivet or other fastening means 81. A sufficiently rigid lever arm and sufficiently large bearing surface between the arm and back plate insure that the axis of the wheel 66 will retain its alignment. A back plate aperture 32a is of sufficient size to accommodate movement of fastening means 66c occasioned by pivoting of the lever arm 75.

Referring back to FIG. 7, a bias ground piece 80 is fixedly attached to the back plate 32 mediate the biased ends 74b, 75b of the lever arms 74, 75. It is adapted to receive, position, and fix one end of a spring 78, 79, so that the force thereof will urge the lever arm biased ends 74b, 75b to separate. Each is preferably independently biased. Thus, for example, wheels 62, 66 are rotatably mounted on axles 62b, 66b. In operation, the biased ends 74b, 75b of levers 74, 75 urge wheels 62, 66 laterally outward into channel 18, thereby exerting an equal and opposite force on the non-moveable wheels 64 and 68 to maintain them in constant contacting alignment with channel 22. It will be appreciated that other wheel positioning means may be utilized in accordance with the present invention provided that they maintain the longitudinal or vertical axis of the back plate substantially parallel to the longitudinal axis of the vertical column 6.

In combined operation of the first and second roller means, the front faces 62f, 66f and 64f, 68f of each of the wheels attached to the back plate 32 are urged against the forward inside walls of their respective channels 18, 22 due to the force exerted by rollers 34 and 36 against column front face 16, which is transmitted, in sequence, via the bushings 40, 42, side plates 26, 28, and back plate 32. For example, front faces 62f, 64f of wheels 62, 64 are urged against the inside faces 18i, 22i of channels 18, 22. This action maintains the carriage in front to back alignment with respect to the base. Alternately stated, it provides rotational alignment with respect to the longitudinal column axis. Left to right alignment is provided as the radial surfaces 62r, 64r and 66r, 68r of the opposing back wheel pairs are urged against the back surface 18b, 22b of each channel 18, 22. Thus, the alignment structure disclosed herein is self-aligning and of universal application with photographic apparatus support structures or the like.

Referring to FIG. 3, tension bias means 96 is fixedly attached to the top of column 6 and back plate assembly 32 at a central forward portion 94 of the ground piece 80 by a fastener 97. It is biased toward coiling about drum 96a to exert a lifting force on the back plate and carriage substantially in the plane defined by channels 18 and 22. The lifting force of the spring counterbalances the weight on the chassis and the photographic apparatus 10.

It is believed that the embodiments herein illustrated and described accomplish all of the above enumerated objects and have made apparent a number of modifications which can be made in the invention disclosed by those having the benefit of the foregoing teachings without departing from the spirit and scope of these principles. Accordingly, it is intended that this invention be limited only by the scope of the appended claims.

What is claimed is:

1. An alignment structure comprising:
    a column having first track means along one side extending generally the full length thereof and second track means along an opposite side of said column generally coextensive with said first track means;
    carriage means associated with said column for movement therealong;
    first roller means rotatably mounted on an axle transverse to the longitudinal axis of said column, said first roller means captively journaled in said carriage for movement toward or away from said column;
    first bias means urging said first roller means into contact with said first track means;
    second roller means including rollers attached to said carriage and in rotational engagement with said second track means, each of said rollers rotatably mounted on an axis transverse to the longitudinal axes of said column and said first roller means, said second roller means including two spaced-apart rollers fixedly aligned with said longitudinal column axis and a biased roller means laterally spaced and movable with respect to said fixed rollers; and second bias means urging said biased roller means into lateral engagement with said second track means to maintain said fixed rollers in alignment therewith, whereby the first and second roller means cooperate to maintain said carriage in three-dimensional alignment with said column.

2. The alignment structure of claim 1 wherein the longitudinal axis of said column is generally vertical.

3. The alignment structure of claim 1 wherein said column is of generally U-shaped cross section.

4. The alignment structure of claim 1 or 3 wherein said column has opposing generally parallel side walls connected by a front wall generally perpendicular to said side walls.

5. The alignment structure of claim 1 wherein said first track means comprises a planar surface of said column.

6. The alignment structure of claim 1 wherein said second track means comprises a channel formed along a side of said column generally opposite said first track means.

7. The alignment structure of claim 1 wherein said second track means comprises a pair of opposing channels, each formed in an opposite side of said column.

8. The alignment structure of claim 1 wherein said first roller means is captively journaled in an eccentricly mounted bushing.

9. The alignment structure of claim 1 wherein said first roller means comprises two rollers mounted in spaced fixed relation on an axle transverse to said column, said axle disposed at the lower front of said carriage.

10. The alignment structure of claim 9 further comprising knurled knobs affixed to either end of said transverse axle, rotation of said knobs being transferred to said axle and said rollers mounted thereon, whereby carriage movement is effected along said longitudinal column axis.

11. The alignment structure of claim 1 wherein said first bias means comprises:
a bushing rotatably mounted in a side wall of said carriage, said bushing intersected by and coupled with said transverse axle at a location other than the center of rotation of said bushing; and
an elongated arm disposed perpendicular to said transverse axle, a first end portion attached for rotation with said bushing and a second end portion moveable and connected to a bias force means.

12. The alignment structure of claim 1 or 11 wherein said bias means are located at both sides of said carriage.

13. The alignment structure of claim 1 wherein said second roller means biased roller means comprises two rollers laterally spaced and moveable with respect to said fixed rollers.

14. The alignment structure of claim 1 wherein said wheels have radially disposed bearing surfaces and laterally disposed bearing faces together conforming to the configuration of said second track means.

15. The alignment structure of claim 1 or 14 wherein said second roller means biased roller means is spring-biased into engagement with said second track means.

16. The alignment structure of claim 1 or 14 wherein said second roller means is attached to a biased lever for pivotal engagement with said second track means.

17. The alignment structure of claim 1 including means to counterbalance the weight of said carriage.

18. The alignment structure of claim 17 wherein said counterbalance means comprises a spring fixedly attached to the carriage at one end and attached at the other end to a drum rotatably mounted at the top rear of said column, said spring being biased toward coiling about said drum, whereby said spring exerts a lifting force on said carriage.

19. An improved photographic apparatus alignment structure having a generally vertical column, a carriage operatively connected to said column for movement thereon to a selected vertical position, and means for securing said photographic apparatus to said carriage, said alignment structure comprising:
a front roller means rotatably mounted on an axle transverse to said column and disposed at the lower front of said carriage, said front roller engaging a forward face of said column;
means for biasing said front roller against the forward face of said column with an eccentric bushing and urging said carriage into axial alignment with said column; and
first and second wheels laterally spaced and mounted at the rear of said carriage, said first and second wheels coplanar with the rear of said column and rotatably engaged in opposed generally vertical channels in the rear of said column, whereby said front roller and first and second wheels cooperate to maintain the carriage in three-dimensional alignment with said column.

20. The support structure of claim 19 wherein a spring is fixedly attached to said carriage at one end and attached at the other end to a drum rotatably mounted at the top rear of said column, said spring being biased toward coiling about said drum, whereby said spring exerts a lifting force on said carriage.

21. The support structure of claim 20 wherein said spring is fixedly attached to said carriage near the vertical plane of said first and second wheels.

22. The alignment structure of claim 19 wherein said means for biasing said front roller against the forward face of said column comprises:
an eccentric cam bushing rotatably mounted in a side wall of said carriage, said bushing intersected by and coupled with said transverse axle;
an elongated arm disposed perpendicular to said transverse axle, a first end portion attached for rotation with said bushing and a second end portion moveable and connected to a bias force means; and
a tension spring connecting the first end portion of said arm to said carriage whereby said eccentric bushing is rotated causing said transverse axle and the roller mounted thereon to be biased against said column.

23. The alignment structure of claim 19 wherein said first wheels are fixedly mounted in spaced vertical relation at the rear of said carriage and said second wheels are laterally disposed and adjustably positioned with respect to said first wheels, and first and second wheels rotatably engaged in said channels in the rear of said column.

24. The alignment structure of claim 23 wherein said first and second wheels have beveled edges and said substantially vertical column channels are formed in conforming relation thereto.

25. The alignment structure of claim 23 wherein said second wheels are rotatably mounted on spring-biased arms acting to maintain said second wheels in constant positional agreement with said channel and thereby effect lateral self-alignment of said carriage with respect to said column.

26. The alignment structure of claim 19 wherein said first and second wheels are mounted on a single back plate assembly fixed to the rear of said carriage.

27. The alignment structure of claim 19 wherein said back plate assembly includes two of said first wheels and one of said second wheels.

28. The alignment structure of claim 19 wherein said back plate assembly comprises two of said first wheels and two of said second wheels, said first and second wheels coplanar with each other and with said column.

29. The alignment structure of claim 19 wherein said back plate assembly comprises first wheels fixedly mounted in vertical alignment on the back plate of said carriage and second wheels in vertical alignment with each other and in lateral alignment with respect to said first wheels, said second wheels adjustable against said channel, whereby said carriage is urged into lateral alignment with respect to said column.

30. The alignment structure of claim 29 wherein said second wheels are rotatably mounted on spring-biased lever arms.

31. The alignment structure of claim 29 wherein said back plate assembly further comprises:
a centrally mounted receiving member;
a pair of arms each having first and second ends, each arm pivotally mounted to said back plate at a point mediate said first and second ends, one of said second wheels rotatably mounted on each one of said first ends; and
a pair of bias means, each extending from said receiving member to said arm second end.

32. A back plate assembly for a carriage alignment device comprising at least two wheels fixedly mounted in vertical alignment with each other to the back plate of said carriage; at least one adjustably mounted wheel laterally spaced from and coplanar with said fixedly mounted wheels; and means for laterally positioning said adjustably mounted wheel.

* * * * *